May 11, 1965 C. C. CUTLER 3,183,313

ECHO SUPPRESSOR OPERABLE BY A PILOT TONE

Filed Dec. 16, 1960

INVENTOR
C. C. CUTLER
BY
ATTORNEY 3,183,313

ECHO SUPPRESSOR OPERABLE BY A PILOT TONE

Cassius C. Cutler, Gillette, N.J., assignor to Bell Telephone Laboratories, Incorporated, New York, N.Y., a corporation of New York Filed Dec. 16, 1960, Ser. No. 76,358
6 Claims. (Cl. 179—170.4)

Figure 1:
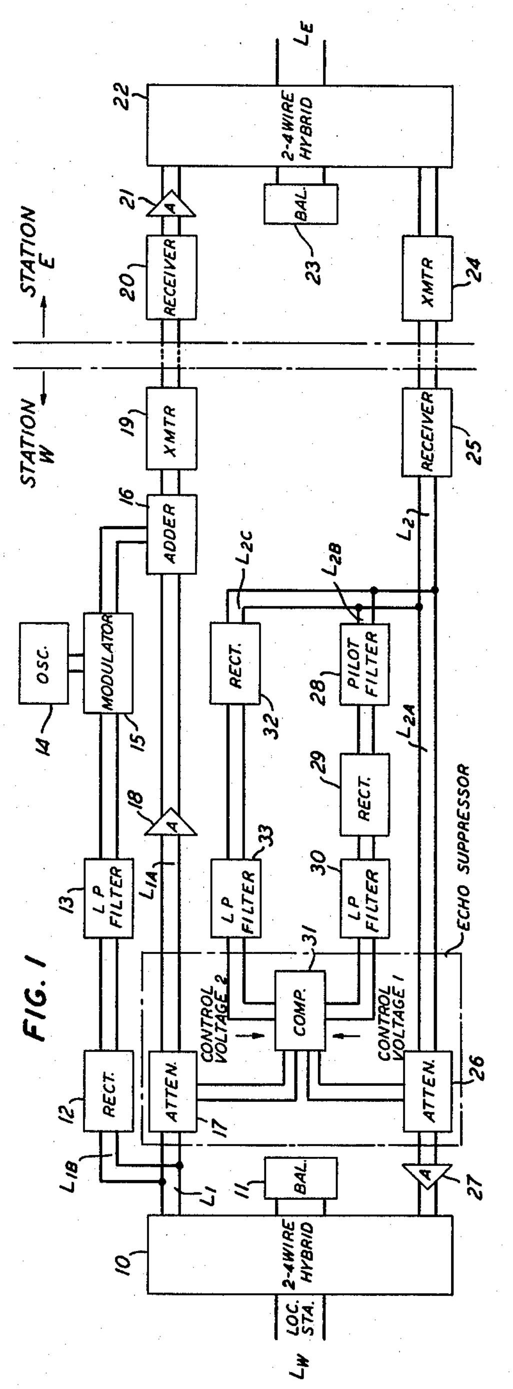

This invention relates to echo suppressors for four-wire transmission systems and more particularly to echo suppressors usable in systems having substantially larger transmission delay than those encountered in the past.

As is well known in the art, it is the usual practice in telephone transmission systems to interconnect local two-wire circuits such as subscriber lines by an arrangement which provides a separate facility for each direction of transmission. Although hybrid networks are commonly employed to reduce interaction between the two transmission facilities, it is found that when energy is transmitted to a two-wire local line by one of the paths of the four-wire circuit, a part of the transmitted signal is reflected and returns over the other path of the four-wire circuit. From the point of view of a speaker at a terminal of such a system having two-wire-to-four-wire transitions gives rise to echoes because a portion of his voice signal is returned to the speaker and appears in his receiver.

If the returned signal has a delay of less than 50 milliseconds, it is known the echo will not be detected as an echo by the speaker and thus will not present any difficulties. However, new and modern transmission systems such as that employing a space satellite as an active repeater or transmission systems utilizing long lines for the transmission of the signal energy can cause delays of signal energy up to 0.6 seconds. If no means are provided to suppress the echo component, its presence will lead to disastrous results as the speaker will always get an earful of the syllables of his last talk spurt.

Apparatus for echo suppression has taken many forms. For example, so-called split echo suppressors have been used in prior transmission systems to reduce the echoes; one suppressor being placed near one talker, the other suppressor being placed near the other talker. This type of suppressor has been found to work well with signals of low delay; however, serious complications arise when this type of suppressor is used in transmission systems, such as the aforementioned type, wherein there is a large delay in the transmission facility. An example will fully illustrate the disadvantages of this type of suppressor for use in transmission systems having a long delay characteristic.

Suppose there is a 0.6 second round trip delay in the transmission path between stations. If both speakers began to speak at approximately the same time, the split suppressors would block both paths; therefore, words or parts of words would be lost because neither speaker knows the other is talking until at least 0.3 second after that speaker had begun to speak. Another objection to these echo suppressors is that they cannot distinguish the answer from the echo and if break-in means are provided to allow the listener to speak even though the other person is still talking, the echo will be allowed to come back. If the "hangover time," i.e., the time it would take for the suppressor to deenergize after the actuating signal died out, were increased to equal the overall delay of the system, parts of the answer would be cut out; therefore, this solution is not acceptable.

Thus, the primary object of the present invention is to provide an echo suppressor which is suitable for two-wire-to-four-wire transmission systems having long delays such as those encountered in the aforementioned transmission system employing a space satellite repeater.

Another object of the invention is to provide an echo suppressor which will distinguish the echoes from an answer.

In accordance with the above objects, the system of the present invention comprises an echo suppressor, situated in a first station, which generates an inaudible tone proportional to the signal energy produced by a first speaker which is to be transmitted. This tone is transmitted along with the signal energy to the receiving or second station. If an echo arises in the two-wire local circuit of the receiving station, it will be transmitted by this second station back to the first station. However, the tone, as it appears in the echo, will then operate the echo suppressor situated in the said first station thereby to eliminate the echo; thus the return energy will not reach the first speaker. The speaker at the second station can gain control of the circuit by speaking a little louder than the echo. The need for split suppressors and their attendant disadvantages are eliminated by operating the suppressor by the pilot tone appearing in the echo.

Figure 2:
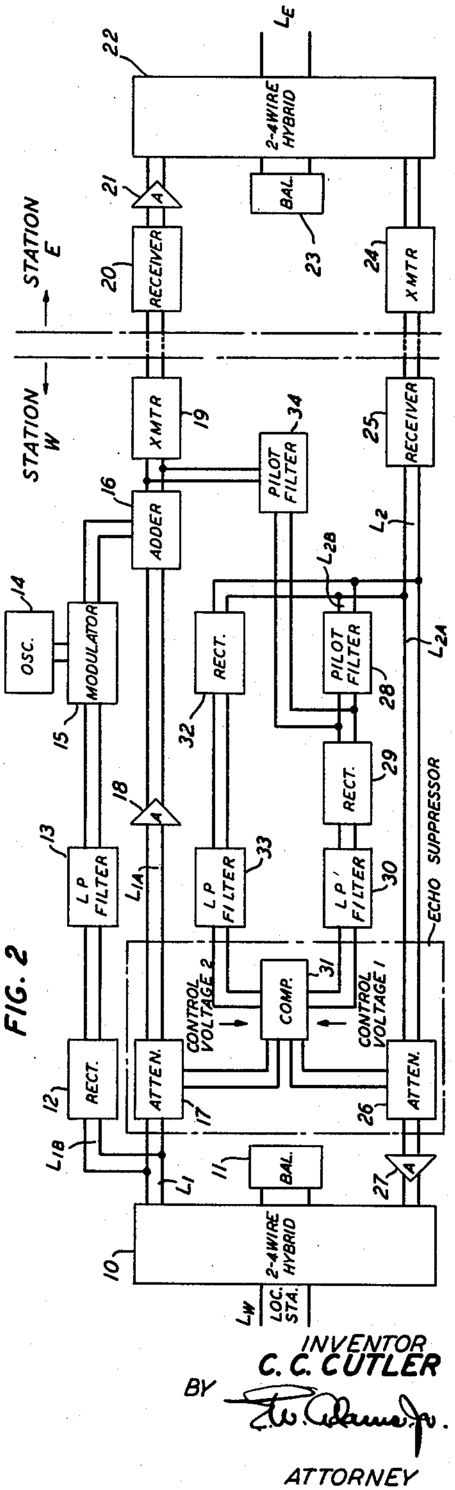

The above and other features of the invention will be more apparent from the following description of the present invention taken with the drawing in which:

FIG. 1 is a schematic circuit diagram of a transmission system utilizing the echo suppressor of the present invention; and FIG. 2 is a schematic circuit diagram of another embodiment of the echo suppressor of the present invention illustrating means enabling the speaker to control the circuit by his direct speech as well as his echo.

Like characters of reference in the several figures of the drawing correspond to the same elements. For convenience of description, the speaker producing the signal energy originating from the station wherein the echo suppressors is contained will be denoted as the near-end speaker. The other speaker will be denoted as the far-end speaker.

As shown in FIG. 1, a two-terminal transmission system is illustrated comprising Station W and Station E. A two-wire local line $L_W$ which may be considered as connecting a subscriber to station W, is connected through a hybrid coil 10 to one end of a four-wire system having separate one-way paths $L_1$ and $L_2$ for transmitting the signal energy in opposite directions. The impedance of the local line $L_W$ is matched by balancing network 11 terminating the local line. The upper transmission path $L_1$ transmits the signal from the near-end speaker on the local line $L_W$; the lower transmission path $L_2$ transmits signal energy from the fare-end speaker to the local line $L_W$. Transmission path $L_1$ actually comprises two paths in parallel, $L_{1A}$ and $L_{1B}$; lower transmission path $L_2$ actually comprises three paths in parallel, $L_{2A}$, $L_{2B}$, and $L_{2C}$.

In the upper transmission path $L_{1A}$ is the direct signal path between Station W and Station E while path $L_{1B}$ contains the means for generating an inaudible pilot tone which varies in proportion to the message signal energy in path $L_{1A}$. The pilot tone generating means comprises rectifier 12 which rectifies the signal energy coming from local line $L_W$. This is connected in series with low-pass filter 13 which passes only those frequencies of the rectified signal energy below a predetermined frequency chosen to provide response to speech components varying at a syllabic rate. Oscillator 14 applies a carrier tone which is outside the audible frequency range to the modulator 15 which is connected to the output of 13. The signal from filter 13 modulates the oscillator tone in modulator 15 which applies the modulated signal to adder 16. The direct signal path $L_{1A}$ contains attenuating means 17 connected in series with amplifier 18. The direct signal energy is also fed to adder 16, which is connected to the output of 18. Adder 16 performs the function of adding both the pilot tone and the signal energy so that both the pilot tone and the direct speech signal are fed to the transmitter 19. The signal is then propagated through the transmission medium to the receiving station, Station E. It is to be noted that the transmission medium may, for example, include one or more satellite repeater links, a long line transmission system such as undersea cables, or even a microwave diversity system.

Station E contains receiver 20 and amplifier 21 connected in series. The upper transmission path of the four-wire system in Station E is connected to the two-wire system $L_E$ by means of the two-wire-to-four-wire hybrid 22. As at Station W, the two-wire line is terminated in a balancing network 23 to match the inmpedance of the local line. Whether an echo arises in the local line $L_E$ or the speaker begins to speak in this local line, the signal will be passed on to the two-way portion of the four-wire system by means of the connection through hybrid 22. The signal will then be transmitted from Station E by means of transmitter 24, through the transmission medium, to the receiver 25 of Station W in path $L_2$.

As noted above path $L_2$ comprises three paths: path $L_{2A}$ is the direct signal or talking path between Station E and Station W. An attenuating means 26 is placed in this path and is followed by amplifier 27 connected in series. This one-way path is connected to local two-wire system $L_W$ by means of hybrid 10. Path $L_{2B}$ contains pilot filter 28, rectifier 29, and low-pass filter 30 all connected in series. The output of low-pass filter 30 is fed to a comparator 31 whose operation will be explained below. Path $L_{2C}$ comprises a rectifier 32 followed in tandem by low-pass filter 33. The output of low-pass filter 33 is likewise fed to comparator 31.

A signal originating in the local line $L_W$ will be connected to the forward transmitting path of the four-wire system through the hybrid coil 10. Part of the signal energy will be rectified by rectifier 12 in path $L_{1B}$ and applied to the syllabic low-pass filter 13. Thus the input to filter 13 will be proportional to the signal energy to be transmitted. The output of low-pass filter 13 will then modulate the signal of inaudible frequency originating in oscillator 14 by means of modulator 15 and feed the tone thereby produced to adder 16. The rest of the signal energy will go through the direct signal path $L_{1A}$, through attenuating means 17, which is inoperative at this time, and amplifier 18 to adder 16. The inaudible pilot tone and the speech signal will be combined in adder 16 and applied to transmitter 19. The signal and the pilot tone will be propagated through the transmission medium by means of transmitter 19 and detected at Station E by means of receiver 20. Both signal and pilot tone will be amplified by amplifier 21 and transmitted to local circuit $L_E$ by means of hybrid 22.

Echo energy is coupled from the two-wire system $L_E$ to the return path of the four-wire system by means of hybrid 22. The energy will be transmitted from Station E by means of transmitter 24 and the signal, after passing through the transmission medium, will be received at Station W by receiver 25. If there were no means of attenuating the echo at this point the echo energy would pass to amplifier 27 in path $L_{2A}$ and be coupled back to the near-end talker at $L_W$ by means of hybrid 10. However, the output of receiver 25 is connected to the three parallel paths $L_{2A}$, $L_{2B}$, and $L_{2C}$. In path $L_{2B}$ the pilot tone in the echo is applied to and detected by pilot filter 28, which will pass only the pilot tone but reject the speech part of the echo in path $L_{2B}$. This will produce an output at pilot filter 28 which is applied to rectifier 29 and low-pass filter 30, and employed as control voltage 1 for comparator 31. The received signal energy will also be rectified by rectifier 32 in path $L_{2C}$ and filtered by low-pass filter 33 to be applied as control voltage 2 to comparator 31.

Reference to FIG. 1 will show that the comparator has two outputs; one connected to attenuating means 17, the other connected to attenuating means 26. Either one or the other of these outputs will be energized to actuate its respective attenuating means.

In this embodiment the comparator compares the two control voltages. The difference of the control voltages is taken to indicate which of the two control voltages is the larger. Thus the larger control voltage determines which one of the two aforementioned outputs of comparator 31 will be energized, i.e., if control voltage 1, corresponding to the pilot tone in the echo, is greater, attenuating means 26 will be energized. If the far-end speaker produces a signal larger than the echo, control voltage 2 will control the output of comparator 31 and attenuating means 17 will be actuated.

The attenuating means, 17 and 26, may be of any conventional type and may for example comprise a relay circuit which, when energized, places a short circuit in the respective direct speech path to thereby short out any signal which may be present.

The sensitivity of comparator 31 to control voltage 1 is made greater than the sensitivity to control voltage 2. Thus if the amplitude of the pilot signal in path $L_{2B}$ is equal to the amplitude of the speech signal in path $L_{2C}$, the output of the comparator will be controlled by control voltage 1. Therefore, if the far-end speaker is silent, the output of the comparator will always correspond to control voltage 1 thereby actuating attenuating means 26 to attenuate any signal energy in path $L_{2A}$.

When the far-end speaker begins talking, the signal received at receiver 25 in Station W will produce an output at low-pass filter 33 which will be greater than the output of low-pass filter 30. Thus, control voltage 2 will now control the output of comparator 31 to thereby actuate attenuating means 17 rather than means 26. It is to be noted that the far-end speaker may gain control of the circuit even though the near-end speaker is talking, by just speaking louder than the pilot tone as it appears in the echo.

In another embodiment of the present invention the attenuating means 17 and 26 comprise rheostat means wherein the resistance of the rheostat is continually varied in response to their input signals. In this embodiment the comparator is replaced by an element which will produce two outputs which are directly proportional to the two inputs. Thus control voltage 1 will adjust the rheostat in attenuating means 26 in accordance with the strength of the echo; control voltage 2 will adjust the rheostat in attenuating means 17 in accordance with the strength of the speech signal energy in path $L_{2A}$. In both cases more resistance will be added in the paths $L_{2A}$ and $L_{1A}$ as the strength of the echo signal and the speech signal energy, respectively, increase. This embodiment may be more advantageous than that considered above if the sharp interruptions produced by relays of the more conventional attenuator are extremely objectional to the listener. By using rheostats a smooth and continuously varying attenuation of the respective signals is easily obtained with less discomfort to the listener.

In a third embodiment the rheostats of the above-mentioned embodiment are replaced by variable gain amplifiers. Thus the inputs to the attenuating means will continuously vary the gain in the direct signal paths depending on the levels of the control voltages applied. If control voltage 1 is low due to the fact the echo is weak, the gain of the amplifier in attenuating means 26 will be relatively high whereas if the echo is strong, control voltage 1 will be large thereby producing a small gain, if any, through attenuating means 26. If the echo is extremely strong the amplifier will be cut off thereby attenuating the signal in path $L_{2A}$ completely. The amplifier of attenuating means 17 operates in a like manner. This embodiment has the further advantage that there is a negligible transition period to overcome, as would be encountered in devices such as the embodiments previously described, where a finite interval exists between the time the signal is applied to the rheostats and the time it reaches its final value of resistance. Furthermore, in both the second and third embodiments, it is to be noted the change in attenuation is smooth rather than abrupt.

In FIG. 2, an echo suppressor of the present invention is illustrated, wherein the near-end speaker will control the echo suppressor on his direct speech signal as well as by the echo.

In this arrangement all the elements of the system having like numbers perform the same function as the corresponding elements of FIG. 1 and further, the output of adder 16 is also connected to a pilot filter 34 as well as transmitter 19. The output of pilot filter 34 is connected to path $L_{2B}$ between pilot filter 28 and rectifier 29.

The pilot tone generated in the branch including elements 12, 13, 14 and 15, by the same operation described in connection with FIG. 1, in addition to being added to the speech signal energy in adder 16 and transmitted to Station E by transmitter 19, is filtered by pilot filter 34, which passes only the pilot signal and attenuates all other frequencies, and transmitted to path $L_{2B}$. Thus control voltage 1 will be proportional to the value of the pilot tone as it is in the echo in addition to the value of the pilot tone as transmitted through filter 34. This embodiment has the added advantage that the far-end speaker, to gain control of the circuit, must speak louder than the near-end speaker, not just a little louder than the echo signal as in the embodiment described in reference to FIG. 1.

What is claimed is:

1. In a communication system comprising at least first and second stations interconnected by a forward transmission path and a return transmission path, means in said first station for applying an intelligence signal to said forward path for transmission to said second station, means in said second station for receiving a portion of said intelligence signal while inherently reflecting a portion thereof as an echo upon said return path, and means in said first station for reducing said echo comprising means for applying a pilot signal representative of said intelligence signal energy to said forward path, a portion of said pilot signal being inherently reflected upon said return path along with said portion of said inelligence signal, means in said first station for comparing said pilot signal and intelligence signal in said return path and for producing an output representative of their difference, and means responsive to said output of said means for comparing for varying the transmission losses in said paths.

2. The combination according to claim 1 wherein said pilot signal has an amplitude proportional to the amplitude of a portion of the frequencies comprising said intelligence signal.

3. The combination according to claim 1 wherein said means for varying the transmission losses in said paths inserts a substantial attenuation into said return path when said pilot signal therein is larger than intelligence signal therein.

4. The combination according to claim 1 including means in said second station for applying an intelligence signal to said return path wherein said means for varying the transmission losses in said paths inserts a substantial attenuation into said forward path when the total intelligence signal originating from both stations in said return path is larger than said pilot signal therein.

5. The combination according to claim 1 wherein said means for applying said pilot signal includes a rectifier and a low pass filter for deriving from said intelligence signal a component varying at the syllabic rate thereof, a source of signal energy above the frequency of said intelligence signal, and means for modulating said derived component upon said last named signal to produce said pilot signal.

6. The combination according to claim 1 including means in said first station for combining a portion of said pilot signal derived directly from said forward path with the portion of said pilot signal reflected upon said return path, and for applying said combined portions to said means for comparing.

References Cited by the Examiner

UNITED STATES PATENTS

| | | | |
|---|---|---|---|
| 2,098,350 | 11/37 | Mitchell | 179—170.4 |
| 2,209,667 | 7/40 | Taylor | 179—170.4 |
| 2,248,746 | 7/41 | Davis | 179—170.4 |
| 2,964,598 | 12/60 | Parker | 179—170.6 |

ROBERT H. ROSE, *Primary Examiner.*

L. MILLER ANDRUS, NEIL C. READ, *Examiners.*